Patented Mar. 20, 1945

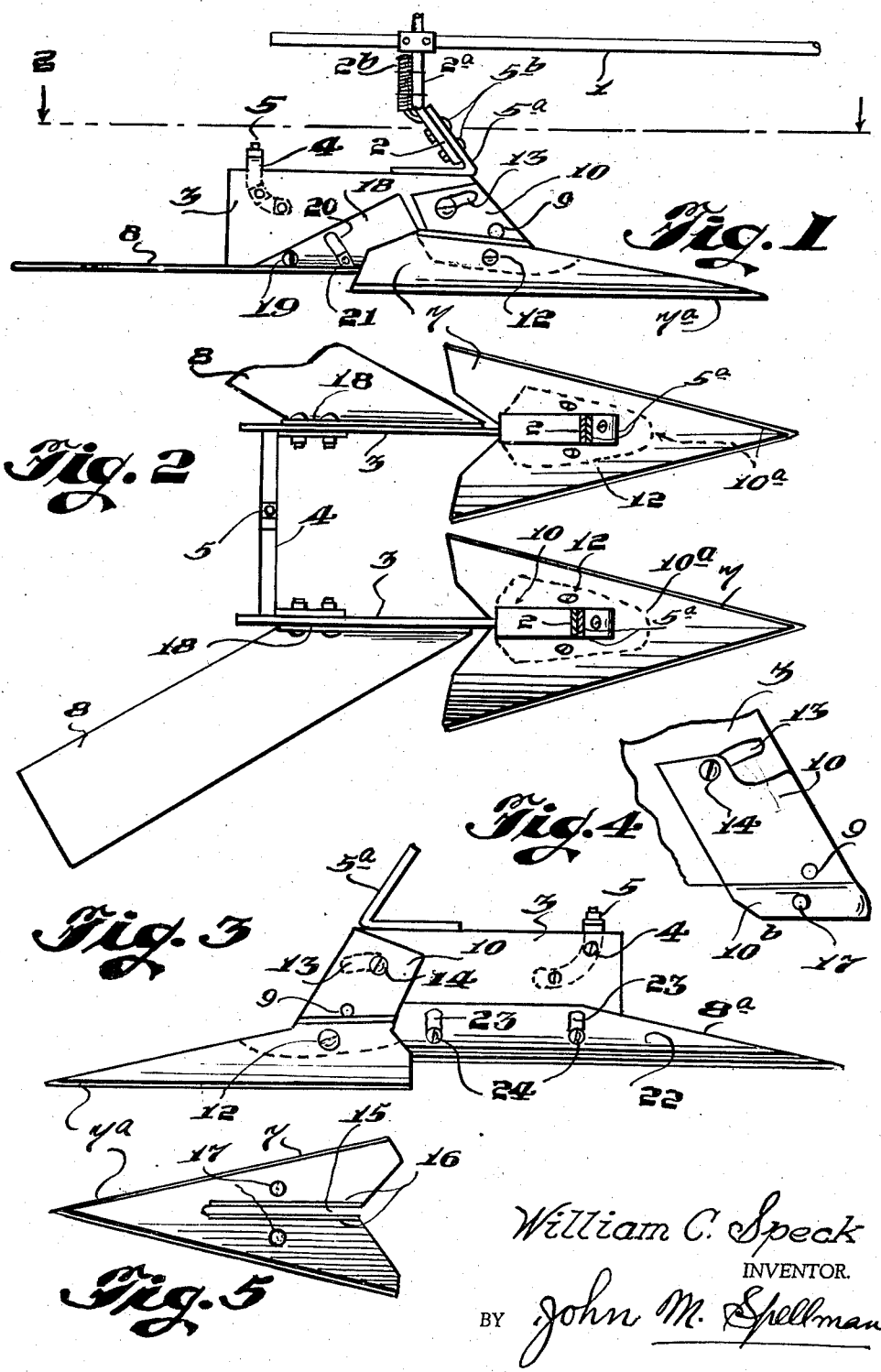

2,371,718

UNITED STATES PATENT OFFICE 2,371,718

CULTIVATOR ATTACHMENT

William C. Speck, Lamesa, Tex.

Application March 31, 1944, Serial No. 528,831

2 Claims. (Cl. 97—179)

This invention relates to improvements in agricultural implements and refers more particularly to an attachment for cultivators.

Generally the invention provides a cultivator attachment for the cutting of weeds, grass and vegetation on the sides of a hill or ridge between furrows. The attachment is also intended for the harvesting of legumes, like beans, peas, etc., in order to clip or cut the stem of the vines close to the ground.

More specifically, the attachment provides in addition to the foregoing features, runners which are provided for mounting the cutting elements, the runners being reinforced in a novel and efficient manner by means which permits relative adjustment of the parts to suit different widths of rows.

The particular object of the invention is to provide an attachment with the above characteristics and in addition provided also with a safety measure, should one of the cutter elements strike a rock, or other hard obstruction, whereby instead of bending or injuring the cutters these elements are deflected or tuned in the arc of a circle and the injury avoided.

The invention also includes other important advantages and objects, all of which may be readily understood from a perusal of the following detailed description, taken in connection with the accompanying drawing, and in the drawing:

Figure 1 is a view showing the attachment in side elevation, operatively secured to a cultivator beam;

Figure 2 is a plan view of the attachment, partly broken away, the view being on the line 2—2 of Figure 1;

Figure 3 is a view similar to that of Figure 1, but illustrating a modification of the invention;

Figure 4 is a fragmentary sectional view of means for deflecting a shovel and means for attaching the same to runners; and Figure 5 is a plan view of one of the shovels removed from the runners.

In accordance with the drawing and referring to Figure 1, a cultivator beam of ordinary construction is shown at 1, and 2 is a foot piece which ordinarily supports a shovel, the latter being removed. The foot piece is connected to the customary vertical rod 2a and 2b is a spring usually included in cultivators of this type. The rod 2a is slidably and vertically adjustable in a spring held block, also of common construction.

The device consists of spaced runners 3, adjustably held in proper spaced relation by braces 4, over-lapping each other as shown in Figure 2, and secured in such adjustable spaced relation by the bolts 5. A relatively flat angle iron member 5a is welded to the upper edges of the runners 3 and connected by bolts 5b to the foot piece 2.

On the runners 3 are removably secured shovels 7 with cutting edges, diverging from a point 7—a to the rear and so spaced as to provide the most effective cutting action on the soil, plants or the like. To the rear of these shovels and also removably secured to the runners are sweep cutters 8, which also are provided with cutting edges.

In Figure 4 is shown a fragmentary sectional view of the forward portion of one of the runners. To this portion of the runner is attached by rivet 9 an element 10, the element being on both sides of the front marginal edge of the runner, in fact straddling the same. The lower end of this element is formed into a foot piece 10—b or flanged portion and which foot piece forms a continuation at 10—a. This provides an opening so that when the shovel, mounted on the foot piece by the bolts 12, is deflected, the rivet 9 will permit the element 10 to move outwardly in the slot 13 and held in such pivotal relation by the bolt 14, until the shovel can be readjusted. In Figure 5 is shown one of the shovels, which has a slot 15 with a slight flange 16 on each side of the slot, and which can be readily slipped over the foot piece of the element 10 and secured by bolts 12 in the holes 17. If desirable, however, the shovel may be welded to the foot piece 10b. The bolts 12 securely hold the shovels in position and the bolt 14 is made just tight enough to permit slippage should the shovel strike a rock, stump or other obstruction.

The sweep cutters 8 have flange formations 18 bent at right angles to the blade as shown in Figure 1. These sweep cutters are likewise pivoted by a bolt 19 which acts the same as the rivet 9 in the foot piece and permits the sweep on either side of the runners to be deflected on striking an obstruction to prevent injury to the sweep, as the slot 20 in the sweep slides on a line with a bolt 21.

In Figure 3 is shown a modification of the invention, the runners 3 shovels 7 element 10 slot 13 bolt 14 and rivet 9 being identical in operation and construction, but the sweep cutters 8a instead of being bent at right angles to their main body portion, are curved as at 22. This permits these sweep cutters to be shifted somewhat like in the arc of a circle to get a more efficient cutting edge operation on the soil and vegetation. This is brought about, in addition to the curved flanged portion of the sweeps by slots 23 and bolts 24, the bolts being tightened when the desired angle is attained of the sweep.

From the foregoing it will be apparent that the attachment provides an efficient device for the purposes intended, and is capable of being connected to one operated with any standard cultivator.

In addition to the weed, vegetable and soil treating facilities, it presents a novel means for preventing injury to the cutting elements. It should be understood, however, that the invention may be modified to some extent, in keeping with the spirit of the disclosure and in keeping with the claims appended hereto.

What I claim is:

1. A cultivator attachment comprising spaced runners, each runner having a member embracing the forward portion thereof, folded over the forward edge of the runner and extending below the runner and providing a flared apron, a plow foot having a central elongated slot and adapted to be slid inwardly of each of the members embracing the runners and being supported by said flared apron; and a sweep cutter carried on the rear of the runners.

2. A cultivator attachment as claimed in claim 1, each of said members which embrace each of the runners being pivoted to the runner, a slot in each runner and an adjustment screw traversing the member and passing through the slot, whereby the plow foot held on the apron will be permitted to swing free on striking an obstruction along the line of the slot, including apertures in said plow foot and said apron for securing the latter to the former.

WILLIAM C. SPECK.